United States Patent
Singhal

(10) Patent No.: US 10,482,459 B2
(45) Date of Patent: Nov. 19, 2019

(54) SYSTEM AND METHOD FOR AUTOMATED ACCOUNT CREATION VIA A MOBILE WIRELESS DEVICE IN A PAYMENT SYSTEM

(71) Applicant: Tara Chand Singhal, Torrance, CA (US)

(72) Inventor: Tara Chand Singhal, Torrance, CA (US)

( * ) Notice: Subject to any disclaimer, the term of this patent is extended or adjusted under 35 U.S.C. 154(b) by 642 days.

(21) Appl. No.: 15/214,805

(22) Filed: Jul. 20, 2016

(65) Prior Publication Data

US 2017/0024730 A1    Jan. 26, 2017

Related U.S. Application Data

(60) Provisional application No. 62/197,018, filed on Jul. 26, 2015.

(51) Int. Cl.
| | |
|---|---|
| *G07F 19/00* | (2006.01) |
| *G06Q 20/38* | (2012.01) |
| *G06Q 20/40* | (2012.01) |
| *G06Q 20/32* | (2012.01) |
| *G06Q 20/36* | (2012.01) |
| *H04M 3/42* | (2006.01) |
| *H04M 3/493* | (2006.01) |

(52) U.S. Cl.
CPC ... *G06Q 20/38215* (2013.01); *G06Q 20/3223* (2013.01); *G06Q 20/36* (2013.01); *G06Q 20/4014* (2013.01); *H04M 3/42068* (2013.01); *H04M 3/493* (2013.01); *H04M 2203/105* (2013.01); *H04M 2203/6063* (2013.01); *H04M 2203/6081* (2013.01)

(58) Field of Classification Search
CPC .............................. H04W 12/06; H04W 4/021
USPC ...... 235/375, 379, 380; 705/14.49, 44, 14.4, 705/14.64, 14.66, 14.67, 26.41, 26.7
See application file for complete search history.

(56) References Cited

U.S. PATENT DOCUMENTS

| | | | | |
|---|---|---|---|---|
| 8,612,339 B2* | 12/2013 | Rose | .................... | G06Q 20/108 705/38 |
| 2012/0203667 A1* | 8/2012 | Brody | .................... | G06Q 20/12 705/26.41 |
| 2015/0140957 A1* | 5/2015 | Kiswani | .............. | H04M 17/301 455/406 |

* cited by examiner

*Primary Examiner* — Jamara A Franklin
(74) *Attorney, Agent, or Firm* — Steve Roeder Esq.

(57) ABSTRACT

A system and a method for an automated sign up and creation of an account of a new customer via mobile wireless device of a customer in a payment system on a global computer network is described. The system is automated in that it eliminates login using user id and password and use of forms to provide personal data.

20 Claims, 12 Drawing Sheets

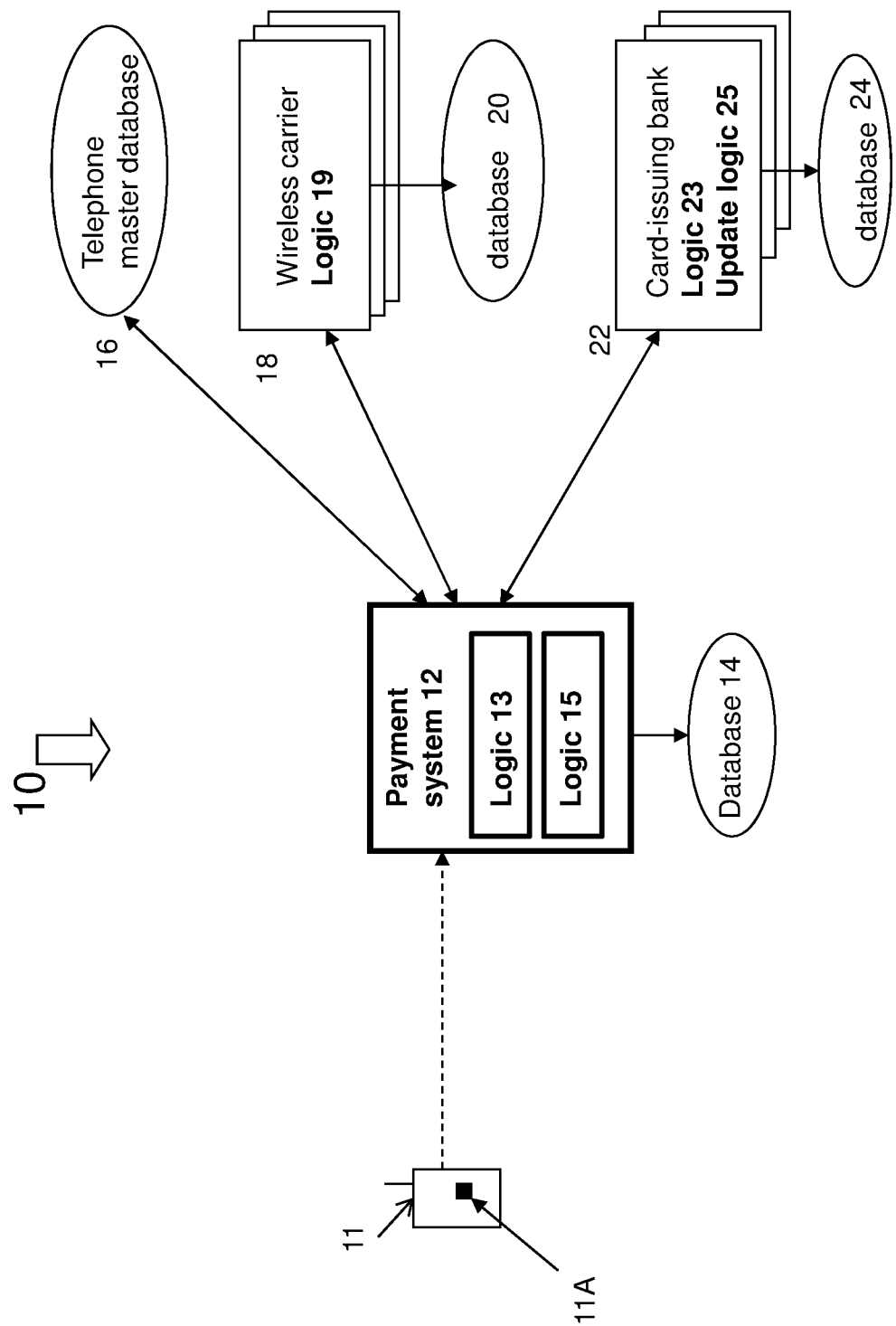

Logic 13 in payment system 12

Logic 13A of the payment system 12 receives a telephone call from a potential customer with a mobile device 11, identifies the caller by caller id; and the payment system 12 interfaces with a global telephone database to determine, for this caller id, carrier type as wireless and carrier identification. If the caller id is for other than a wireless device on a wireless network, as determined from the global telephone database, annunciate a message of "decline only calls from wireless devices are accepted".

Logic 13B of the payment system 12 determines if a customer account already exists in the payment system for this caller, if yes, annunciate a decline message and, if not, begin process of new account creation.

Logic 13C of the payment system 12, with the carrier identification, connects to the specific carrier 18, authenticates the payment system 12 to the carrier 18, with a prior authentication setup, and retrieves customer profile of at least name and address and optionally mobile device ESN, from carrier database 20.

Logic 13D, payment system 12 via an IVR, seeks confirmation of identity by name and address and seeks approval to create a new customer account in the payment system 12 and download a payment app 11A in the device 11.

Logic 13E, payment system 12 creates a new customer record in database 14 and populates the record with the retrieved customer profile from the carrier database 20.

Logic 13F, of the payment system via a pre-authorized prior authenticated interface sends a query to each of the major card-issuing banks, and for those specifically identified by the caller, with caller id as a customer identifier and the customer profile of name and address to identify the customer to the bank and, receives from the bank, bankcard data from each card-issuing bank, if available at that bank for this customer.

Figure 2A

Logic 13 in payment system 12 - continued

Logic 13G payment system encrypts the received bankcard data, populates the newly created customer record in database 14 with the encrypted bankcard data and creates and stores a graphical card icon for each bankcard.

Logic 13H payment system downloads the payment app 11A to the device 11 and creates a security association for the mobile device.

Logic 13J payment system sends the card icon to the mobile device and sends a message of successful account creation to an app in the mobile device.

Figure 2B

Logic 19 in Carrier system 18

| |
|---|
| Logic 19A carrier system 18 receives a query from the payment system 12 with a caller id, authenticates the payment system 12. |
| Logic 19B carrier system 18 determines if a customer account already exists in the carrier system for this caller id, if yes |
| Logic 19C carrier system 18 using database 20 retrieves a customer profile and sends the customer profile to the payment system 12. |

Figure 3

Logic 23 in Card-issuing bank 22

Logic 23A card-issuing bank 22 receives a query from the payment system 12 with a caller id and the customer profile and determine if a bankcard customer account for this customer profile already exists in the card-issuing bank system, if yes Logic 23B card-issuing bank 22, associates the bankcard card data with this caller id in the card-issuing bank database 24

Logic 23C card-issuing bank sends the bankcard data to the payment system 12.

Logic 23D card-issuing bank creates a virtual-card data field in the card issuing bank database 24. This field is used by the card-issuing bank to identify those bankcards that have been sent to the payment system 12. This field is used in the Update Logic 25.

Update Logic 25 in Card-issuing bank 22

Logic 25A when the card expires, card-issuing bank 22 and if the virtual-card flag is set, as in Logic 24D, card-issuing bank sends new bank card data to the payment system 12 with caller id as customer identifier.

Logic 25B when the card is cancelled, and if the virtual-card flag is set, as in Logic 24D, card-issuing bank sends cancellation notification record to the payment system 12.

Figure 4

Logic 15 in the payment system 12

Logic 15A payment system 12 receives from card-issuing bank 22, an updated bankcard data Logic 15B payment system 12 updates payment system database 14 with updated bankcard data.

Logic 15C payment system 12 receives a card cancellation notice from the bank 22.

Logic 15D, payment system updates payment system database 14 by removing the specific card data Logic 15E payment sends notification to the customer mobile device 11 and an update icon to the wireless device.

Figure 5

At step 100, receiving by the payment system 12, a telephone call, from a new payment system customer with a wireless device 11.

At step 102, identifying the customer, by the payment system 12, with a caller Id of the telephone call, connecting to a telephone company database 16, and identifying a specific cellular wireless carrier company for this specific customer and annunciating a message of an unauthorized call, if the call has not been made on a wireless carrier; and declining creation of a new account by the payment system to the customer via the mobile device if an account with this caller id already exists in the payment system;

At step 104, connecting to the specific wireless carrier and verifying the customer as being a customer of the cellular wireless device company in good standing and retrieving by the payment system, a customer profile including at least a customer name, an address and optionally a mobile device id ESN/IMEI from the carrier database.

At step 106, seeking confirmation by the payment system via an interactive voice response (IVR) system, of customer identity by name and address and seeking approval to create a new customer account in the payment system.

At step 108, seeking identification of card-issuing banks of the customer by the payment system via an interactive voice response (IVR) system;

At step 110, creating by the payment system 12 a new customer record in a payment system database 14 for the customer and connecting by the payment system 12 to a card-issuing bank 22 with a customer identifier, identifying the customer to the customer's bank 22 and receiving/retrieving the customer's a plurality of bankcard data.

At step 112, encrypting the bankcard data by the payment system and populating a payment system database 14 with a plurality of encrypted bankcard data anchored by the caller id and ESN.

Figure 9

At step 114, seeking approval from the customer via the IVR to download a payment app in the customer mobile device and downloading a payment app to the mobile device.

At step 116, establishing a security association by the payment system for the wireless device 11 and sending wirelessly to the wireless device 11 of the customer, by the payment system 12 graphical icons of the bankcards for use in an app hosted in the wireless device.

At step 118, sending a notification by the payment system to the mobile app that the account has been successfully created, creating automatically by the payment system, a new customer record in the payment system for use subsequently in a payment transaction.

At step 120, receiving a query by card-issuing bank 22 from payment system 12 with a caller id and customer profile and determine if a bankcard customer account for this customer profile already exists in the card-issuing bank database 24, if yes, At step 122, associating by the bank 22, a bankcard card data with this caller id in the database 24.

At step 124, sending by the bank 22, the bankcard data to the payment system 12.

At step 126, sending by the bank 22, when the card expires, new card data to the payment system 12 with caller id as customer identifier.

At step 128, sending by the bank 22, when the bankcard is cancelled, a cancellation notification record to the payment system 12.

Figure 10

SYSTEM AND METHOD FOR AUTOMATED ACCOUNT CREATION VIA A MOBILE WIRELESS DEVICE IN A PAYMENT SYSTEM

CROSS REFERENCE

This application claims priority from provisional patent application Ser. No. 62/197,018, of Tara Chand Singhal, filed Jul. 26, 2015, titled "System and Method for Automated Account Creation via a Mobile Wireless Device in a Payment System on a Global Computer Network. The application No. 62/197,018 is incorporated herein by reference.

FIELD OF THE INVENTION

A system and a method for an automated sign up and creation of an account of a new customer via mobile wireless device of a customer in a payment system on a global computer network is described.

BACKGROUND

A large variety of services and applications are provided by servers on a global computer network. All these services and application require access to these servers and all require a customer to have an internet connection and access to a personal computer.

These applications also require an account to be created and this requires establishing an account by using a logon process and by creating and using a user id and a password. These services further require submitting personal profile data such as name, address, e-mail address etc in addition to other data required for a specific service. This data is provided to the servers via a fill-in web-based form to the system.

It is the objective of the embodiments herein to have a simpler, faster and more convenient account creation process for a specific service that of a payment system. It is also an objective to eliminate all these steps of an account creation of using a user id and selecting and using a password and filling a webform.

SUMMARY

Systems and methods for an automated sign-up with creation of an account in a payment system on a global computer network, of a new customer, via a mobile wireless device of the customer, are described.

To understand the significance and value of the embodiments and improvements of this invention, which are directed to both customer convenience and cyber security, prior art with the help of FIG. 11 is first described.

FIG. 11 describes the prior art methods of creating an account in a prior art payment system 200. The prior art payment system 200 has a bankcard database 202 and an interface to card authorization network including card-issuing banks 204.

FIG. 11 provides simplified illustrations of two prior art methods. One of these methods, devices and interfaces 210 using a laptop 212 are used. In the other of these methods, devices and interface 220, using a mobile wireless device 222 may also be used to establish an account and provide bankcard data to the payment system 200.

Prior art method 210 using a laptop device 212 requires a user id & password account 213 creation and login to the payment system 200 using a secure https internet data connection 215 also requires web-based form 214 to collect and send private data related to bankcards to the payment system 200.

Prior art method 220 that has come in use since the advent of Apple Pay by Apple using smart phones, uses a smart phone 222, with a camera 224 that is able to scan or take an image of the bankcard 226. The bankcard image using OCR software is converted to bankcard data and is sent via secure interface 230 to the payment system 200.

In some prior art, the bankcard data is stored in the mobile device itself only and transferred to a merchant sales terminal by technologies such as near-field-communication (NFC). In some other prior art embodiments, the bankcard data stored in the mobile device itself is stored in an encrypted form and transferred to a merchant sales terminal in the encrypted form for the card-issuing bank to decrypt the bankcard data.

These prior art methods and similar other methods, not described here, have inherent security risks, as the bankcard data is first provided to a device and once it is acquired by the device, then it is temporarily stored in the device before it is transferred to the payment system over an internet connection. These methods are also cumbersome requiring a customer to have and see his bankcards.

The automated sign-up and account creation system and method of the embodiments described herein, initially with the help of FIG. 1 and later with the help of FIGS. 2 to 10 have unique and novel features in that the embodiments described herein, (i) eliminate use of a user id and password, (ii) eliminates entry of personal data in a web-form, or entry of bankcard data in other ways, and (iii) also eliminates the very need to have a physical bankcard in the personal possession of the customer.

Thus, the embodiments described here make it quick and convenient for customers to sign-up with the payment system. The payment system stores bankcard data and is used to facilitate private and secure payments from card-issuing banks of customers to merchants or other payees.

As an example, such a payment system is described in a U.S. Pat. No. 7,890,433 issued Feb. 15, 2011 issued to Singhal, the inventor of this application, titled "private and secure payment system". U.S. Pat. No. 7,890,433 is incorporated herein by reference. A similar payment system is also described in U.S. Pat. No. 8,195,568, issued Jun. 5, 2013 to Singhal, inventor of this application, titled, "method and apparatus for a payment card system".

This invention and the embodiments described herein are directed to an automated sign-up system and a method for such a payment system as has been described in the above referenced U.S. Pat. Nos. 7,890,433 and 7,890,433 and similar other payment systems that store customer bankcard data.

The sign-up system embodiments described herein may also be used for secure mobile payments using any payment system from other business entities such as Apple Pay, Google Pay, or with any bank affiliated or sponsored similar payment system such as those being contemplated by Wells Fargo Pay and Chase Pay.

These payment systems of others using mobile devices all require entry of customer bankcard data by different means, including direct data entry or imaging a bankcard using a mobile device camera coupled with performing an OCR of the imaged bankcard data as has been described earlier with the help of prior art FIG. 11.

These payments systems of others are not ruled out from using the embodiments as described herein as all of these payment services require a payment system that stores customer personal data including bankcard data.

Further, use of a user id and password based system by a customer has inherent multiple security weaknesses as have been covered extensively by news media and also well familiar to information security professionals. The embodiments described herein, it is believed eliminate all these type of security threats.

The sign up system of this application is automated in that it eliminates login using user id and password and also eliminates use of web-based forms or other means to provide personal data such as name, address and bankcard data to a central or a payment system.

Further not only the process of transferring bankcard data to payment system but as a consequence storing bankcard data in databases also has security issues of being hacked as has also been covered extensively in news media and is well known to information security professional. It is believed these types of security threats may also be eliminated by the embodiments described herein.

The sign-up system has a method of an automated sign up and creation of an account of a new customer in a payment system that has the steps of, where all the steps may not be used or used in the order specified:

(i) receiving a telephone call by the payment system from a new payment system customer with a wireless device;

(ii) identifying the customer by the payment system, with a caller Id of the telephone call, connecting to a telephone company database, and identifying a specific cellular wireless carrier company for this specific customer;

(iii) annunciating a message of an unauthorized call, if the call has not been made on a wireless carrier but has been made on a landline phone or internet phone;

(iv) declining creation of a new account by the payment system to the customer via the mobile device if an account with this caller id already exists in the payment system;

(v) connecting to the specific wireless carrier and verifying the customer as being a customer of the cellular wireless device company in good standing and retrieving by the payment system, a customer profile including at least a customer name, an address and optionally a mobile device id ESN/IMEI from the carrier database;

(vi) seeking confirmation by the payment system via an interactive voice response (IVR) system, of customer identity by name and address and seeking approval to create a new customer account in the payment system;

(vii) seeking identification of card-issuing banks of the customer by the payment system via an interactive voice response (IVR) system;

(viii) creating by the payment system a new customer record in a payment system database for the customer and connecting by the payment system to identified card-issuing banks with the caller id as a customer identifier and with the customer profile;

(ix) identifying the customer by the customer's bank using customer profile data and retrieving the customer's bankcard data and sending to the payment system for populating in the payment system database;

(x) seeking approval from the customer to download a payment app in the mobile device;

(xi) downloading a payment app to the mobile device and establishing a security association for the mobile device with the payment system;

The method has further steps of: (xii) encrypting the bankcard data received from the card-issuing bank by the payment system and populating the payment system database with a plurality of encrypted bankcard data anchored by the caller id and ESN;

(xiii) sending a notification to the payment app in the mobile device that a customer account has been successfully created in the payment system, thereby automatically creating by the payment system a new customer record in the payment system for use subsequently in a payment transaction;

(xiv) sending wirelessly to the wireless device of the customer, by the payment system graphical icons of the bankcards for use in an app hosted in the wireless device.

The embodiments described herein require business and technical data interface relationships with business partners. These business partners include at least the card-issuing banks and the wireless carrier telephone companies.

It is believed that the major card-issuing banks may be four or more but less than ten. The wireless carrier companies may also be four or more but less than ten. That there are a limited number of major card-issuing banks and also a limited number of wireless carrier companies that would facilitate negotiating and setting up such business and technical data interfaces.

It is believed that these business and technical data interface relationships are in the interests of these business partners as they may earn additional revenues from providing these technical data services to the business entity that manages and provides the payment system that would use and deploy the automated sign-up system of the embodiments described herein.

These and other aspects of the embodiments herein are further described in detail with the help of the accompanying drawings and the description, where similar numbers are used to identify similar features of the embodiments.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIG. 1 is a block diagrams that illustrate features of the present embodiments of an automated sign-up system on to a payment system;

FIG. 1 is a block diagram, which illustrate system and interface features of the present embodiments of an automated sign-up system on to a payment system;

FIGS. 2A-2B are block diagrams, which illustrate logic features of the present embodiments of an automated sign-up system on to a payment system;

FIG. 3 is a block diagram, which illustrate logic features of the present embodiments of an automated sign-up system on to a payment system;

FIG. 4 is a block diagram, which illustrate database features of the present embodiments of an automated sign-up system on to a payment system;

FIG. 5 is a block diagram that illustrates features of the present embodiments of an automated sign-up system on to a payment system;

FIG. 9 is a block diagram that illustrates method features of the present embodiments of an automated sign-up system on to a payment system; and FIG. 10 is a block diagram that illustrates method features of the present embodiments of an automated sign-up system on to a payment system.

DESCRIPTION

Introduction

Figure 6:
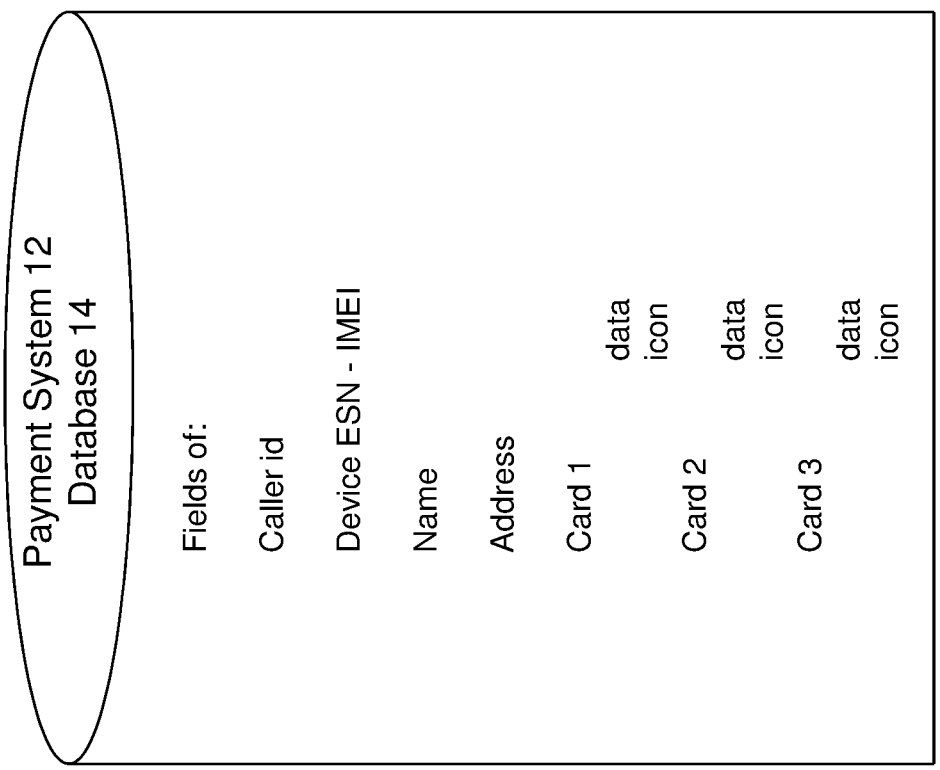
FIG. 6 is a block diagram that illustrates database features of the present embodiments of an automated sign-up system on to a payment system.

With reference to FIG. 1, system 10 is an automated sign-up system and is used for automatic creation of an account in a payment system. The payment system is a prior art payment system on a global computer network that is used for facilitating payment transactions from multiple bankcards to any type of merchant.

The system 10 has unique and novel features in that it eliminates use of a user id and password and also eliminates entry of personal data in a web-form, by a customer thus making it secure, quick, and convenient for customers to sign-up with the payment system using his/her mobile wireless device alone in a matter of minutes.

The embodiments described herein require business and technical data interface relationships with business partners. These business partners include at least the card-issuing banks and the wireless carrier telephone companies.

It is believed that these business and technical data interface relationships are in the interests of these business partners as they may earn additional revenues from providing these technical data services to the business entity that manages and provides the payment system that would use and deploy the automated sign-up system of the embodiments described herein.

First of these business and data interface relationships is with the card-issuing banks. This specific business relationship between the payment system business entity and the card-issuing bank requires establishing a private, one of a kind account with each of the card-issuing banks, using a private and secure communication channel, wherein the card issuing bank's computer systems would authenticate an interface request from the payment system, would receive from the payment system, a bankcard customer identification in the form of a customer name, customer address, and optionally customer mobile device identifier in the form of telephone number and search the card-issuing bank's database to identify the customer, and retrieve the bankcard data and send the bankcard data to the payment system over the interface.

Depending on the volume of traffic on this private and secure channel, such an interface could be set up as a permanent data interface without requiring authenticating each time a bankcard data request is made.

Further, the bankcard data maintained by the card-issuing bank may be subject to change over time due to multiple reasons, such as the bankcard has expired and a new bankcard had been issued, bankcard has been stolen and new replacement bankcard had been issued, or similar other reasons.

The card-issuing bank under these conditions would pro-actively update the bankcard data in the payment system under this business relationship. Thus assuring that the bankcards stored in the payment system database are the current and valid bankcard data.

The card-issuing banks may earn a nominal fee for participating in this business relationship or may be inclined to do so without such a fee as this ultimately helps the security and viability of the mobile payment eco-system, of which the card-issuing banks may be part of.

Second of these business and data interface relationships is with the wireless carrier companies. This specific business relationship between the payment system business entity and the wireless carrier company requires establishing a private, one of a kind account with the each of the wireless carrier company, using private and secure communication channel, wherein the wireless carrier company's computer systems would authenticate an interface request from the payment system, would receive from the payment system, a customer identification in the form of a customer telephone number and search the wireless carrier's database to identify the customer, and retrieve customer personal information of name and address and other identifying and verifying data and send the customer personal data to the payment system over the interface.

Depending on the volume of traffic on this private and secure channel, such an interface could be set up as a permanent data interface without requiring authenticating each time a personal data request is made.

The wireless carrier companies may earn a nominal fee for participating in this business relationship or may be inclined to do so without such a fee as this ultimately helps the security and viability of the mobile payment eco-system, of which they would be a part of.

As illustrated in FIG. 1, the system 10 has a payment system 12 operative with logic 13 and logic 15 and a database 14. The logic 13, and logic 15 and database 14 are described later with reference to FIGS. 2, 3 and 6 respectively.

The payment system 12 also has interfaces with a mobile device 11, a global telephone database 18, a wireless carrier 18 and multiple card-issuing banks 22.

For the mobile device 11, the payment system 12 receives a call from the mobile device, and as part of the account creation process in the payment system is downloaded a payment app for use by the mobile device to make a payment to a merchant using payment system 12.

For the wireless carrier 18, the carrier logic 19 and carrier database 20 are described with reference to FIGS. 3 and 7.

For a card-issuing bank 22, the bank logic 23, bank logic 25 and bank database 24 are described with reference to FIGS. 4 and 8.

FIGS. 9 and 10 describe method diagrams for the operation of the system 10

These and other aspects of the embodiments are described herein where the headings are provided for reader convenience.

Payment System 12

As an illustration, payment system 12 is described in U.S. Pat. No. 7,890,433 issued Feb. 15, 2011, as a central system and is incorporated herein by reference. The payment system 12 is operative with logic 13 and logic 15 and database 14 as described in this application.

Logic 13 in the Payment System 12

Logic 13 is illustrated with the help of FIGS. 2A-2B and has the following sub-logics.

Logic 13A of the payment system 12 receives a telephone call from a potential customer with a mobile device 11, identifies the caller by caller id; and the payment system 12 interfaces with a global telephone database to determine, for this caller id, carrier type as wireless and carrier identification. If the caller id is for other than a wireless device on a wireless network, as determined from the global telephone database, annunciate a message of "decline only calls from wireless devices are accepted".

Logic 13B of the payment system 12 determines if a customer account already exists in the payment system for this caller, if yes, annunciate a decline message and, if not, begin process of new account creation.

Logic 13C of the payment system 12, with the carrier identification, connects to the specific carrier 18, authenticates the payment system 12 to the carrier 18, with a prior authentication setup, and retrieves customer profile of at least name and address and optionally mobile device ESN, from carrier database 20.

There are three types of wireless telephone numbers and wireless telephone service customers. These three types are categorized as, business account customers, post paid customers and pre-paid customers.

The wireless carrier maintains customer profile data only for customers who are post paid and billed every month and for them carrier maintains personal identity and credit profile data. The embodiments described herein are intended to work for post-paid customers and not for business customer and pre-paid customers. Generally, pre-paid customers are cash customers and do not qualify for bankcards and have bankcards.

Logic 13D, of the payment system 12 via an IVR, seeks confirmation of customer identity by name and address and seeks approval from customer to create a new customer account in the payment system 12 and download a payment app 11A in the device 11.

Logic 13E, of the payment system 12 creates a new customer record in database 14 and populates the record with the retrieved customer profile from the wireless carrier database 20.

Logic 13F, of the payment system via a pre-authorized prior authenticated interface sends a query to each of the major card-issuing banks, and for those specifically identified by the caller, with caller id as a customer identifier and the customer profile of name and address to identify the customer to the bank and, receives from the bank, bankcard data from each card-issuing bank, if available at that bank for this customer.

As an alternative embodiment, to the Logic 13F, the IVR system of payment system may collect bankcard data directly from the customer, wherein in the first step, customer is requested to select the card-issuing bank identification and in the second step, customer is asked to input four numeric fields of the bankcard data. These four numeric fields are (i) 4 digit bank code, (ii) 12 digit account number, (iii) 4 digits of expiration code, and (iv) a three digit security code.

After the bankcard data is received by the payment system from the customer in this manner via the mobile wireless device, the bankcard data may be verified with the card-issuing bank to maintain the integrity of bankcard data in the payment system database.

Logic 13G, of the payment system encrypts the received bankcard data, populates the newly created customer record in database 14 with the encrypted bankcard data and creates and stores a graphical card icon for each bankcard.

Logic 13H, of the payment system downloads the payment app 11A to the device 11 and creates a security association for the mobile device.

Logic 13I—skipped intentionally

Logic 13J, of the payment system sends the bankcard icon to the mobile device and sends a message of successful account creation to the payment app in the mobile device.

Logic 15 in the Payment System 12

Logic 15 is illustrated with the help of FIG. 5 and has the following sub-logics.

Logic 15A of the payment system 12 receives, via a pre-authorized interface setup with card-issuing banks, from card-issuing bank 22, an updated bankcard data, when the customer bankcard data has been updated, such as for renewal.

Logic 15B of the payment system 12 updates payment system database 14 with updated bankcard data.

Logic 15C of the payment system 12 receives a card cancellation notice from the bank 22, when a bankcard in the database 24 has been cancelled due to a number of reasons, such as non-payment or being lost.

Logic 15D, of the payment system updates payment system database 14 by removing the specific bankcard data Logic 15E of the payment sends notification to the customer mobile device 11 and an update icon to the wireless device.

Database 14 of Payment System 12

Database 14 is used to store data related to the automated account creation process and is illustrated with the help of FIG. 6. The database 14 has data fields of:

Caller id
Device ESN-IMEI
Security Association
Name
Address
Card 1
   Bankcard data; icon
Card 2
   Bankcard data; icon
Card 3
   Bankcard data; icon The icon associated with each bankcard is a graphical image that is used to help select and or identify by the payment app 11A in the mobile device 11 to the payment system 12 when initiating a payment transaction.

Interface to Telephone Database 16

A prior art telephone database is used by the global telephone network for routing calls globally and is used to identify the type of the network of the called party.

This prior art telephone global database is used in this invention to identify the type of network and name of network in which the caller device is operating. This prior art function as used as a part of routing calls worldwide is adapted for use in this invention to identify the type of carrier and the identification of the carrier.

Therefore, the payment system 12 has an interface to a telephone database 16 for the purpose of identifying the type of caller id as being a mobile device and the carrier of the wireless network in which the device operates.

As has been described earlier with the help of Logic 13, and sub logic 13A, payment system 12 sends a query to the database 16 with the data of caller id and receives in return the name of the carrier company and the type of equipment, such as internet, mobile, landline, PBX etc.

If the device is not mobile and not part of a known wireless network which can verify the customer, no new account is created in the payment system. That is the account creation process only works for those who call the payment system from a mobile device and from a known and identifiable cellular network company.

Interface to Wireless Carrier System 18

The payment system 12 has an interface to each of the wireless carriers 18 for the purpose of retrieving customer profile of name and address of the customer whose mobile device it is that called the payment system 12. In the US there are four major wireless telephone carriers that include AT&T, Verizon, Sprint and T Mobile. That means the payment system is able to interface with these companies systems to retrieve customer profile of name and address.

There are other wireless companies, other than these four identified above, which make use of the wireless network of these wireless carriers, but maintain their own customer account data. The embodiments described herein also works with these other wireless companies as long as they maintain customer data. The embodiments described herein would not and are not intended to work for prepaid wireless devices from prepaid wireless carriers who do not maintain customer data.

Logic 13 sends a query to the wireless carrier 18 with the caller id, and the carrier 18 system using carrier logic 19 and carrier database 20 returns the customer profile data to the payment system 12. The customer profile data is limited to name and address of the customer and optionally mobile device ESN/IMEI. An a priori relationship has been established by the payment system 12 for each of the cellular carriers 18 for this service.

Logic 19 in Carrier System 18

Logic 19 operating in the carrier 18 is used to return customer profile to the payment system when given caller id. Logic 19 has been illustrated with reference to FIG. 3 and has the following sub-logic.

Logic 19A carrier system 18 receives a query from the payment system 12 with a caller id, authenticates the payment system 12.

Logic 19B carrier system 18 determines if a customer account already exists in the carrier system for this caller id, if yes Logic 19C carrier system 18 using database 20 retrieves a customer profile and sends the customer profile to the payment system 12.

Wireless Carrier 18 Database 20

Figure 7:
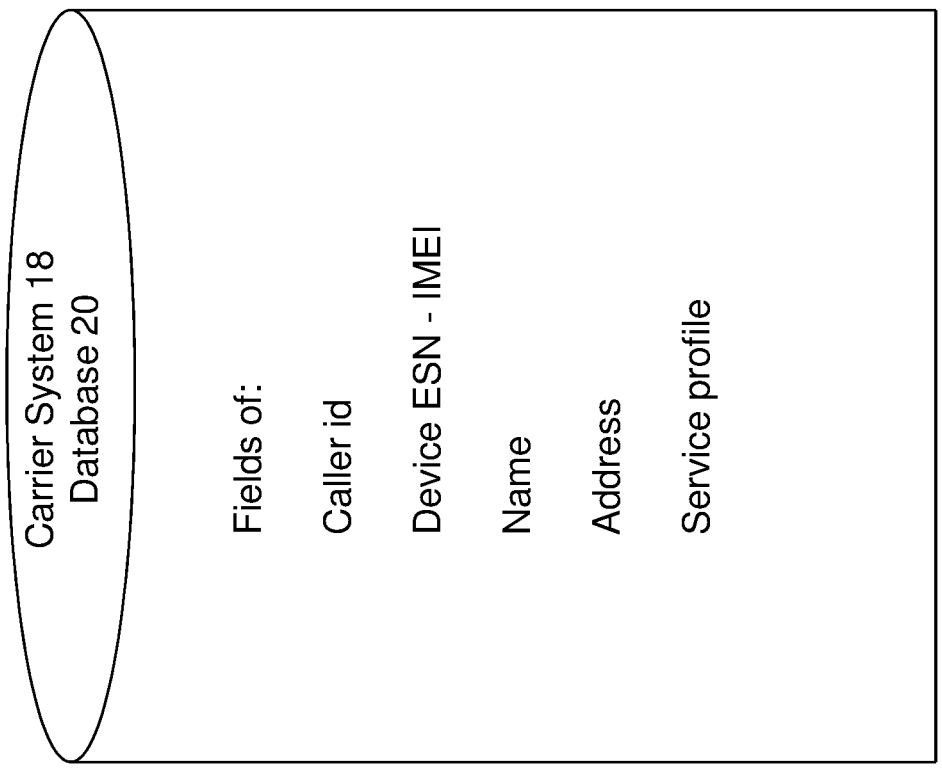
FIG. 7 is a block diagram that illustrates logic features of the present embodiments of an automated sign-up system on to a payment system.

Database 20 is part of the wireless carrier 18 and is illustrated here with the help of FIG. 7 and has data fields of:
 Caller id
 Device ESN-IMEI
 Name
 Address
 Service profile Interface to Card-Issuing Bank 22

The payment system 12 has a prior established interface to all the major card-issuing banks. There are a limited number of card-issuing banks and the payment system connects to or polls each of the banks to find customer bankcard accounts at these banks. The payment system 12 may limit the bankcard searches at these banks to three bankcards for a customer and may also limit such searches to major card-issuing banks. There are only a handful of search large card-issuing banks.

This interface is utilized to retrieve customer bankcard account data. Logics 23 and 25 are operative in the card-issuing bank's systems for this purpose. These are described as follows:

Logic 23 in Card-Issuing Bank 22

Logic 23 has been illustrated with the help of FIG. 4 and has the following sub-logic.

Logic 23A of the card-issuing bank 22 receives a query from the payment system 12 with a caller id and the customer profile and determines if a bankcard customer account for this customer profile already exists in the card-issuing bank system, if yes Logic 23B card-issuing bank 22, associates the bankcard card data with this caller id in the card-issuing bank database 24

Logic 23C card-issuing bank sends the bankcard data to the payment system 12.

Logic 23D card-issuing bank creates a virtual-card data field in the card issuing bank database 24. This field is used by the card-issuing bank to identify those bankcards that have been sent to the payment system 12. This field is used in the Update Logic 25 as described herein Update Logic 25 in Card-Issuing Bank 22

Update Logic 25 has been illustrated with the help of FIG. 4 and has the following sub-logic.

Logic 25A when the card expires, card-issuing bank 22 and if the virtual-card flag is set, as in Logic 24D, card-issuing bank sends new bank card data to the payment system 12 with caller id as customer identifier.

Logic 25B when the bank card is cancelled, and if the virtual-card flag is set, as in Logic 24D, card-issuing bank sends cancellation notification record to the payment system 12.

Card-Issuing Bank Database 24

Figure 8:
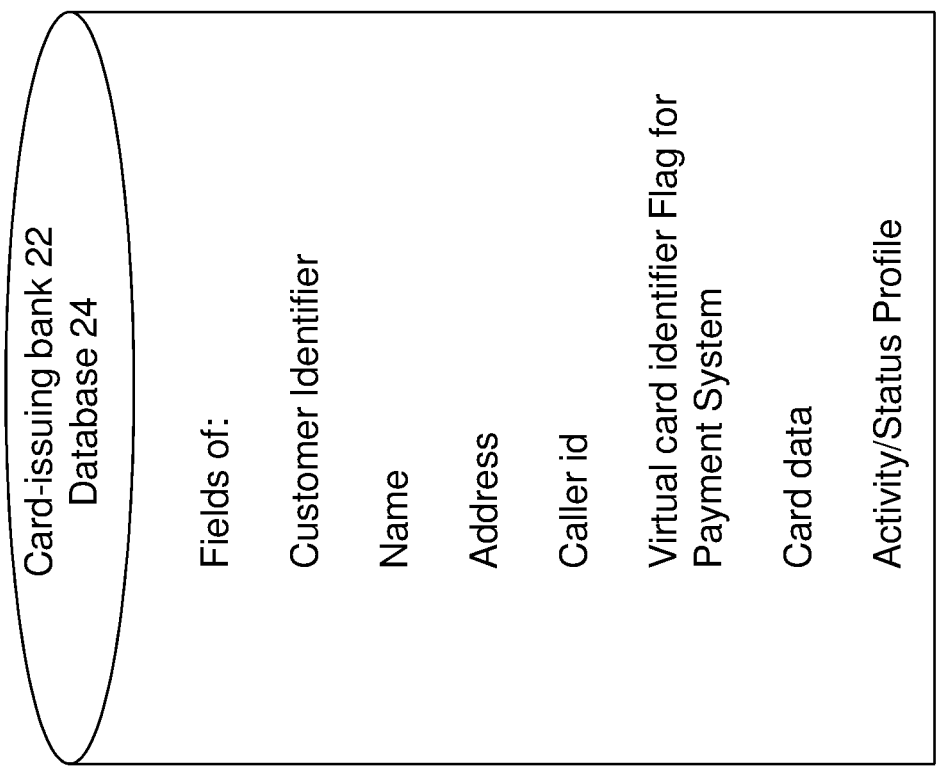
FIG. 8 is a block diagram that illustrates database features of the present embodiments of an automated sign-up system on to a payment system.
Figure 11:
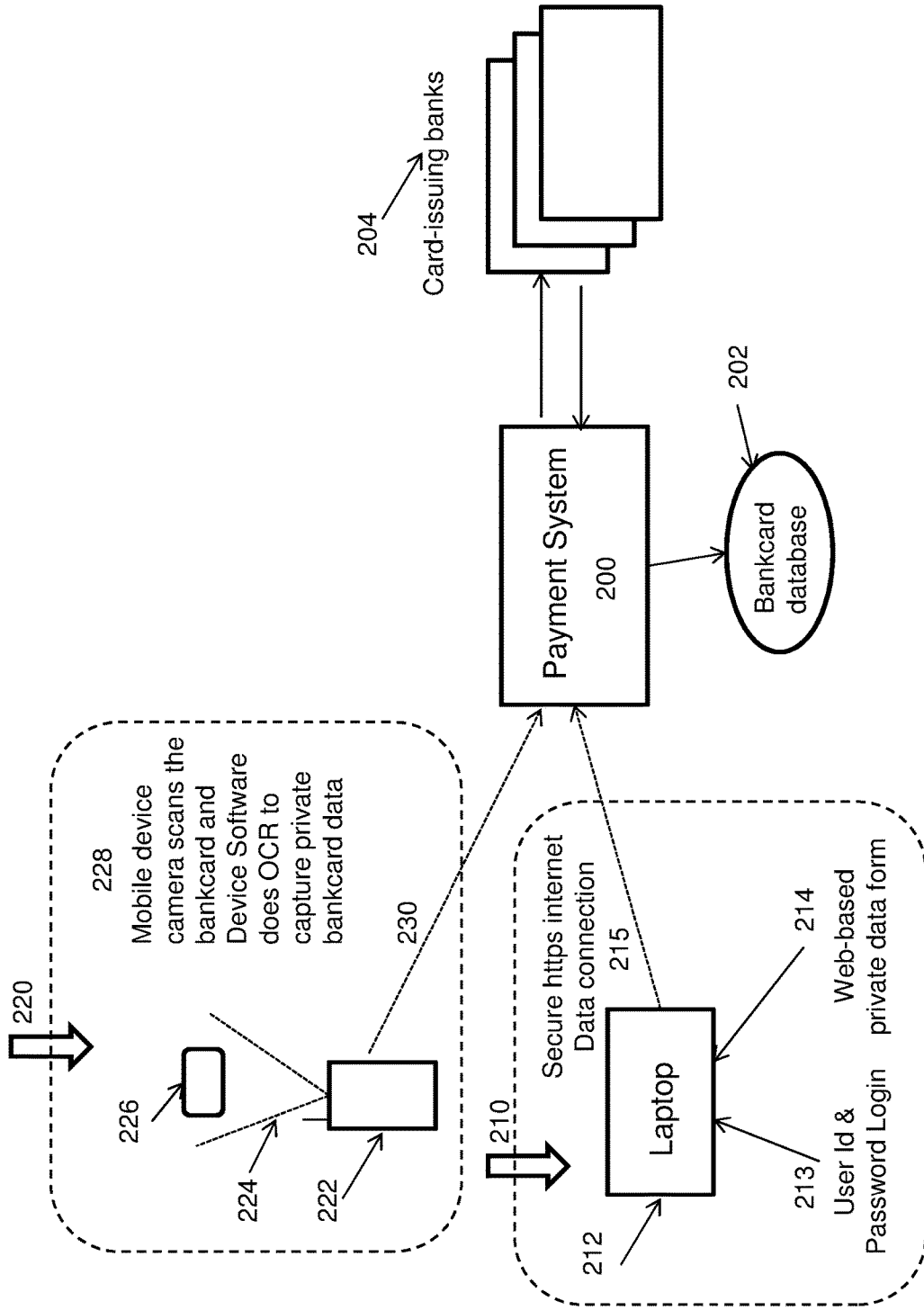
FIG. 11 is prior art block diagram that illustrates prior art bankcard data entry into a prior art payment system database.

Card-issuing bank 22 has a database 24 that has been illustrated with the help of FIG. 8 and has data fields of:
 Customer Identifier
 Name
 Address
 Caller id—customer identifier
 Virtual card identifier for Payment System
 Card data
 Activity/Status Profile Typically a bankcard is a physical item in the hands of a customer and is used as such by the customer either in a brick and mortar store or online for a web-based merchant or via a telephone call to the merchant or a payee.

The bankcard data that is stored in the payment system 12 is not a physical card in the hands of the customer and a customer need not have or keep such physical bankcards, as the payment system 12 is capable to make payments to any type of merchant as has been described in the US patent as in the cross-reference section. Therefore a bankcard that is stored in the payment system 12 is referred to as a virtual bankcard to distinguish it from a physical bankcard.

Method of Operation:

The method of operation is illustrated with the help of FIGS. 9 and 10, where all the steps may not be used or used in the order specified.

At step 100, receiving by the payment system 12, a telephone call, from a new payment system customer with a wireless device 11.

At step 102, identifying the customer, by the payment system 12, with a caller Id of the telephone call, connecting to a telephone company database 16, and identifying a specific cellular wireless carrier company for this specific customer and annunciating a message of an unauthorized call, if the call has not been made on a wireless carrier; and declining creation of a new account by the payment system to the customer via the mobile device if an account with this caller id already exists in the payment system;

At step 104, connecting to the specific wireless carrier and verifying the customer as being a customer of the cellular wireless device company in good standing and retrieving by the payment system, a customer profile including at least a customer name, an address and optionally a mobile device id ESN/IMEI from the carrier database.

At step 106, seeking confirmation by the payment system via an interactive voice response (IVR) system, of customer identity by name and address and seeking approval to create a new customer account in the payment system.

At step 108, seeking identification of card-issuing banks of the customer by the payment system via an interactive voice response (IVR) system;

At step 110, creating by the payment system 12 a new customer record in a payment system database 14 for the customer and connecting by the payment system 12 to a card-issuing bank 22 with a customer identifier, identifying the customer to the customer's bank 22 and receiving/retrieving the customer's a plurality of bankcard data.

At step 112, encrypting the bankcard data by the payment system and populating a payment system database 14 with a plurality of encrypted bankcard data anchored by the caller id and ESN.

At step 114, seeking approval from the customer via the IVR to download a payment app in the customer mobile device and downloading a payment app to the mobile device.

At step 116, establishing a security association by the payment system for the wireless device 11 and sending wirelessly to the wireless device 11 of the customer, by the payment system 12 graphical icons of the bankcards for use in an app hosted in the wireless device.

At step 118, sending a notification by the payment system to the mobile app that the account has been successfully created, creating automatically by the payment system, a new customer record in the payment system for use subsequently in a payment transaction.

At step 120, receiving a query by card-issuing bank 22 from payment system 12 with a caller id and customer profile and determine if a bankcard customer account for this customer profile already exists in the card-issuing bank database 24, if yes, At step 122, associating by the bank 22, a bankcard card data with this caller id in the database 24.

At step 124, sending by the bank 22, the bankcard data to the payment system 12.

At step 126, sending by the bank 22, when the card expires, new card data to the payment system 12 with caller id as customer identifier.

At step 128, sending by the bank 22, when the bankcard is cancelled, a cancellation notification record to the payment system 12.

A method of an automated sign-up and creation of an account of a new customer in a payment system, comprising the steps of:

receiving a telephone call by the payment system from a new payment system customer, using a wireless mobile device of the customer;

identifying by the payment system, a caller Id of the telephone call, connecting to a telephone company database, and receiving from the database identification of a specific cellular wireless carrier company for this specific caller id of the customer;

connecting by the payment system to the specific wireless carrier for verifying the customer as being a customer of the cellular wireless company in good standing; and receiving by the payment system, a customer profile including a customer name, an address, and a mobile device id ESN, from the carrier database.

The method further comprising the steps of: seeking confirmation by the payment system via an IVR, of customer identity by name and address; and seeking approval to create a new customer account in the payment system and download a mobile payment app in the mobile device.

The method further comprising the steps of: creating by the payment system for the customer, using the customer profile, a new customer record in a payment system database.

The method further, comprising the steps of: connecting by the payment system to a card-issuing bank identifying the customer to the card-issuing bank with the caller id as a customer identifier and with the customer profile, and receiving the customer's bankcard data; populating by the payment system, the customer bankcard data in the payment system database.

The method further comprising the steps of: encrypting the bankcard data by the payment system and populating the payment system database with a plurality of encrypted bankcard data anchored by the caller id and ESN.

The method further comprising the steps of: downloading a mobile payment application by the payment system to the mobile wireless device and establishing a security association for the mobile device; storing the security association in the payment system database.

The method further comprising the steps of: sending a notification by the payment system to the payment application in the mobile device that a customer account has been successfully created in the payment system, thereby automatically creating by the payment system a new customer record in the payment system for use subsequently in a payment transaction.

The method further comprising the steps of: sending wirelessly to the wireless device of the customer, by the payment system graphical icons of the bankcards for use in the mobile device application hosted in the mobile wireless device.

The method further comprising the steps of: declining by the payment system to the customer via the mobile device if an account with this caller id already exists in the payment system.

A system for an automated sign up and creation of an account of a new customer in a payment system, comprising:

the payment system has a CPU, a storage system, a memory, and multiple interfaces to other systems and devices, the CPU receives a telephone call from a new payment system customer with a wireless device;

the CPU identifies the customer by, with a caller Id of the telephone call, connects to a telephone company database, and identifies a specific cellular wireless carrier company for this specific customer;

the CPU connects to the specific wireless carrier and verifies the customer as being a customer of the cellular wireless device company in good standing and retrieves a customer profile including a customer name, an address and a device id ESN from the carrier database.

The system further comprising: the CPU declines to the customer via the mobile device if an account with this caller id already exists in the payment system; the CPU via an IVR seeks confirmation of customer identity by name and address and seeking approval to create a new customer account in the payment system and download a payment app in the mobile device.

The system further comprising: the CPU creates a new customer record in a payment system database for the customer; and connects to a card-issuing bank with the caller id as a customer identifier and with the customer profile, identifies the customer to the card-issuing bank and retrieves the customer's bankcard data for populating in the payment system database.

The system further comprising: the CPU encrypts the bankcard data and populates the payment system database with a plurality of encrypted bankcard data anchored by the caller id and ESN.

The system further comprising: the CPU downloads a payment app to the device and establishes a security association for the mobile device; stores the security association in the payment system database.

The system further comprising: the CPU sends a notification to a payment app in the mobile device that a customer account has been successfully created in the payment system, thereby automatically creating by the payment system a new customer record in the payment system for use subsequently in a payment transaction.

The system further comprising: the CPU sends wirelessly to the wireless device of the customer, by the payment system graphical icons of the bankcards for use in the mobile device payment application app hosted in the wireless device.

A method for a card-issuing bank, comprising the steps of: receiving by the card-issuing bank, from a payment system, a customer identifier and a customer profile, identifying the customer in the card-issuing bank database; and creating an identification field or a record for this customer in the card-issuing bank database for existence of a virtual bankcard in the payment system.

The method further comprising the steps of: sending a bankcard data by the card-issuing bank to the payment system.

The method further comprising the steps of: monitoring by the card-issuing bank an update in the bankcard data for those bankcards that have a virtual bankcard identifier; sending the updated bankcard data by the card-issuing bank to the payment system when the bankcard data is updated in the card-issuing bank.

The method further comprising the steps of: monitoring by the card-issuing bank cancellation of the bankcard data for those bankcards that have a virtual bankcard identifier; sending a cancellation record by the card-issuing bank to the payment system when the bankcard is cancelled by the card-issuing bank.

In summary, the preferred embodiments are on a system and a method for an automated sign up and creation of an account of a new customer via mobile wireless device of a customer in a payment system on a global computer network. The sign-up system is automated in that it eliminates login using user id and password and use of forms to provide personal and bankcard data.

While the particular invention, as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A method of an automated sign-up and creation of an account of a new customer in a payment system, comprising the steps of:
receiving a telephone call by the payment system from a new payment system customer, using a wireless mobile device of the customer;
identifying by the payment system, a caller Id of the telephone call, connecting to a telephone company database, and receiving from the database identification of a specific cellular wireless carrier company for this specific caller id of the customer;
connecting by the payment system to the specific wireless carrier for verifying the customer as being a customer of the cellular wireless company; and
retrieving by the payment system, a customer profile including a customer name, an address and a mobile device id ESN from the carrier database.

2. The method as in claim 1, comprising the steps of:
seeking confirmation by the payment system via an IVR, of customer identity by name and address; and
seeking approval to create a new customer account in the payment system and download a mobile payment app in the mobile device.

3. The method as in claim 2, comprising the steps of:
connecting by the payment system to a card-issuing bank identifying the customer to the card-issuing bank with the caller id as a customer identifier and with the customer profile, and receiving the customer's bankcard data;
populating by the payment system, the customer bankcard data in the payment system database.

4. The method as in claim 3, comprising the steps of:
encrypting the bankcard data by the payment system and populating the payment system database with a plurality of encrypted bankcard data anchored by the caller id and ESN.

5. The method as in claim 2, comprising the steps of:
downloading a mobile payment application by the payment system to the mobile wireless device and establishing a security association for the mobile device;
storing the security association in the payment system database.

6. The method as in claim 5, comprising the steps of:
sending a notification by the payment system to the payment application in the mobile device that a customer account has been successfully created in the payment system, thereby automatically creating by the payment system a new customer record in the payment system for use subsequently in a payment transaction.

7. The method as in claim 6, comprising the steps of:
sending wirelessly to the wireless device of the customer, by the payment system graphical icons of the bankcards for use in the mobile device application hosted in the mobile wireless device.

8. The method as in claim 2, comprising the steps of:
declining by the payment system to the customer via the mobile device if an account with this caller id already exists in the payment system.

9. The method as in claim 1, comprising the steps of:
creating by the payment system for the customer, using the customer profile, a new customer record in a payment system database.

10. A system for an automated sign up and creation of an account of a new customer in a payment system, comprising:
the payment system has a CPU, a storage system, a memory, and multiple interfaces to other systems and devices, the CPU receives a telephone call from a new payment system customer with a wireless device;
the CPU identifies the customer by, with a caller Id of the telephone call, connects to a telephone company database, and identifies a specific cellular wireless carrier company for this specific customer;

the CPU connects to the specific wireless carrier and verifies the customer as being a customer of the cellular wireless device company and retrieves a customer profile including a customer name, an address and a device id ESN from the carrier database.

11. The system as in claim 10, comprising:
the CPU declines to the customer via the mobile device if an account with this caller id already exists in the payment system;
the CPU via an IVR seeks confirmation of customer identity by name and address and seeking approval to create a new customer account in the payment system and download a payment app in the mobile device.

12. The system as in claim 10, comprising:
the CPU creates a new customer record in a payment system database for the customer; and
connects to a card-issuing bank with the caller id as a customer identifier and with the customer profile, identifies the customer to the card-issuing bank and retrieves the customer's bankcard data for populating in the payment system database.

13. The system as in claim 12, comprising:
the CPU encrypts the bankcard data and populates the payment system database with a plurality of encrypted bankcard data anchored by the caller id and ESN.

14. The system as in claim 11, comprising:
the CPU downloads a payment app to the device and establishes a security association for the mobile device; stores the security association in the payment system database.

15. The system as in claim 14, comprising:
the CPU sends a notification to a payment app in the mobile device that a customer account has been successfully created in the payment system, thereby automatically creating by the payment system a new customer record in the payment system for use subsequently in a payment transaction.

16. The system as in claim 15, comprising:
the CPU sends wirelessly to the wireless device of the customer, by the payment system graphical icons of the bankcards for use in the mobile device payment application app hosted in the wireless device.

17. A method for a card-issuing bank, comprising the steps of:
receiving by the card-issuing bank, from a payment system, a customer identifier and a customer profile, identifying the customer in the card-issuing bank database; and
creating an identification field or a record for this customer in the card-issuing bank database identifying existence of a flag to associate this customer with the payment system.

18. The method for a card-issuing bank as in claim 17, comprising the steps of:
sending a bankcard data by the card-issuing bank to the payment system.

19. The method for a card-issuing bank as in claim 17, comprising the steps of:
monitoring by the card-issuing bank an update in the bankcard data for those bankcards that have the flag;
sending the updated bankcard data by the card-issuing bank to the payment system when the bankcard data is updated in the card-issuing bank.

20. The method for a card-issuing bank as in claim 17, comprising the steps of:
monitoring by the card-issuing bank cancellation of the bankcard data for those bankcards that have the flag;
sending a cancellation record by the card-issuing bank to the payment system when the bankcard is cancelled by the card-issuing bank.

* * * * *